March 26, 1957 W. A. REICH 2,786,427
TRACK, TROLLEY AND DERAILER ASSEMBLY
Filed Oct. 11, 1954 2 Sheets-Sheet 2
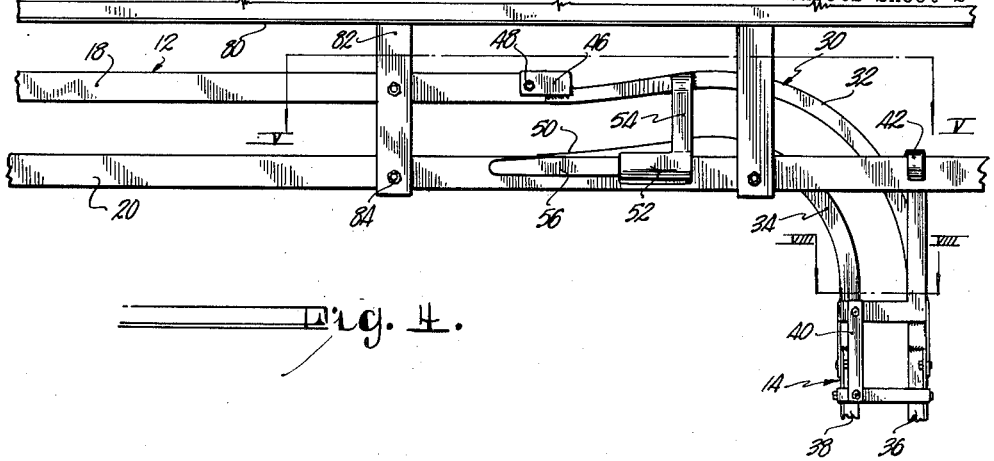
Fig. 4.
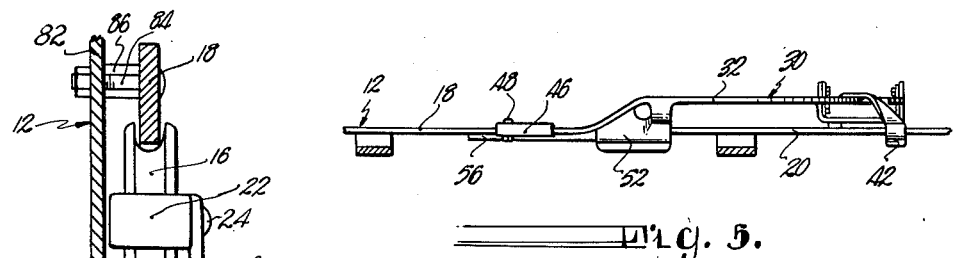
Fig. 5.
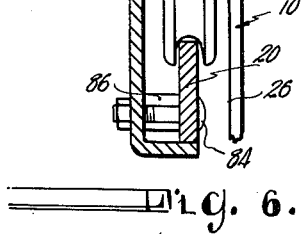
Fig. 6.
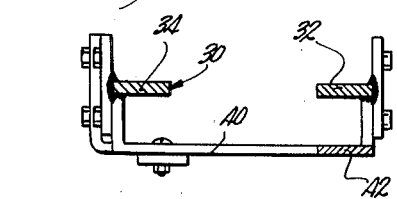
Fig. 8.
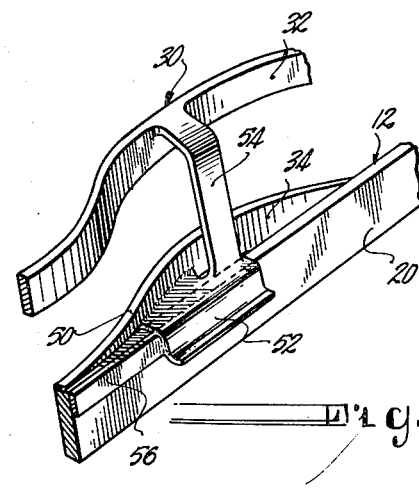
Fig. 7.
INVENTOR.
Walter A. Reich
BY
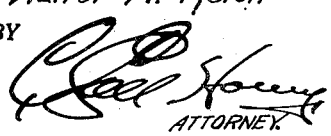
ATTORNEY.

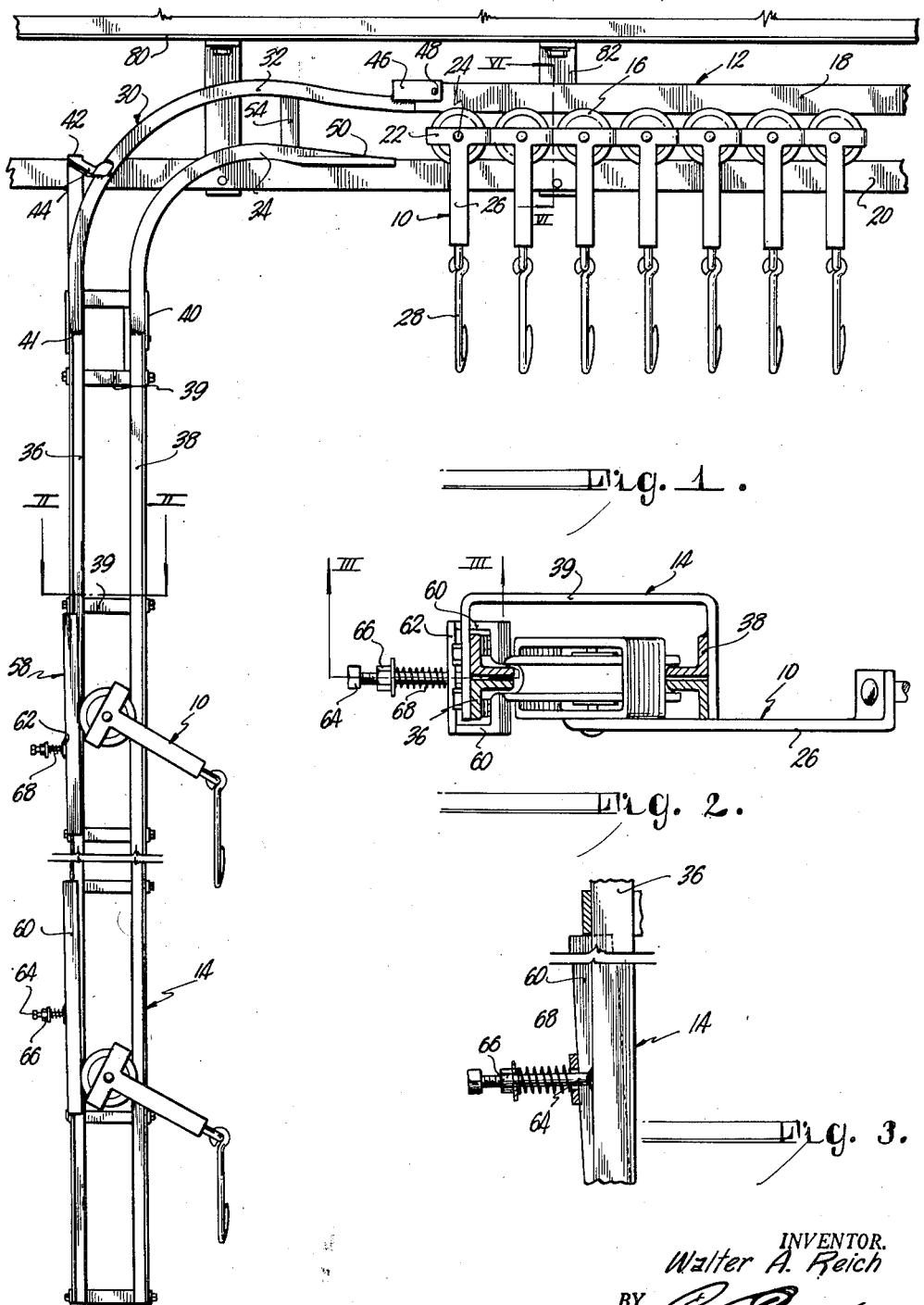

United States Patent Office 2,786,427
Patented Mar. 26, 1957

2,786,427

TRACK, TROLLEY AND DERAILER ASSEMBLY

Walter A. Reich, Kansas City, Mo., assignor to A. Reich & Sons, Inc., Kansas City, Mo., a corporation of Missouri Application October 11, 1954, Serial No. 461,543

3 Claims. (Cl. 104—96)

This invention relates to improvements in conveyor assemblies and particularly to that class of equipment employed in the handling of relatively heavy objects such as sides of beef in slaughter houses, banana bunches in fruit markets, and the like, the primary object being to provide improved derailer means for trolleys used on overhead tracks.

Another important object of the instant invention is the provision of a conveyor assembly of the kind having a plurality of overhead trolleys to the extent of providing a detachable derailer assembly which may be easily removed from one horizontal, trolley-carrying track and readily installed on another such track as may be required.

Another important object of this invention is to provide an assembly as above-mentioned that includes guide chute means for guiding and redirecting the trolleys, after derailment from their overhead horizontal track, to a receiver below.

Other objects include the way in which the guide chute is made up of a pair of spaced runners hanging from a pair of arcuate bars that serve as a derailer for the trolleys; the way in which hooks are provided to removably suspend the guide chute and the derailer from the overhead track; the manner of providing braking means as a part of the guide chute for decelerating gravitational descent of the trolleys along the chute; the way in which the derailer bars are provided with lateral bends for guiding the trolleys away from the overhead track as the same are derailed; the way in which one of the derailer bars has a ramp resting upon the lowermost rail of the overhead track for receiving the wheels of the trolleys; and many additional objects including details of construction, all of which will be made clear as the following specification progresses.

In the drawings:

Figure 1 is an elevational view showing one face of a track, trolley and derailer assembly made pursuant to the present invention;

Fig. 2 is an enlarged, detailed, cross-sectional view taken on line II—II of Fig. 1;

Fig. 3 is an enlarged, fragmentary, detailed, cross-sectional view taken on line III—III of Fig. 2;

Fig. 4 is a fragmentary, elevational view showing the opposite face of the assembly with the trolleys removed;

Fig. 5 is a fragmentary, detailed, cross-sectional view taken on line V—V of Fig. 4;

Fig. 6 is an enlarged, fragmentary, detailed, cross-sectional view taken on line VI—VI of Fig. 1;

Fig. 7 is a fragmentary, perspective view showing the uppermost end of the derailer and looking at that face thereof shown in Fig. 4; and Fig. 8 is an enlarged, detailed, cross-sectional view taken on line VIII—VIII of Fig. 4.

A plurality of trolleys broadly designated by the numeral 10, as shown in Fig. 1 of the drawings, is operably carried by an overhead track 12, a pair of such trolleys 10 being also illustrated in Fig. 1 within a vertical guide chute 14. The trolleys 10 each consist of a peripherally grooved wheel or pulley 16 adapted to receive spaced, horizontal rails 18 and 20 forming track 12, as best seen in Fig. 6.

A loop 22 surrounding the wheel 16 of each trolley 10, journals a shaft 24 for rotatably mounting the wheel 16 within the loop 22 and an L-shaped shank 26 preferably integral with the loop 22, depends therefrom and swingably receives a hook 28 at its lowermost end.

A derailer, broadly designated by the numeral 30, includes a pair of arcuate bars 32 and 34 adapted to receive the wheels 16 therebetween having their lowermost ends secured directly to the upper ends of T-shaped runners 36 and 38 respectively, forming the chute 14. A plurality of spacers 39 maintain runners 36 and 38 parallel. Bracket means 40 interconnected with the chute 14 and derailer 30, which are interconnected by welding as at 41, has a hook 42 looped over the lowermost rail 20 and the bar 32 is reinforced by a gusset 44 joining the same with hook 42. A U-shaped clip 46 rigid to the uppermost end of the bar 32, straddles the proximal end of the rail 18 and is releasably attached to the latter by a suitable fastener 48.

As seen in Figs. 1 and 4, the derailer 30 partially overlaps the track 12 and therefore, rails 32 and 34 are laterally bent adjacent their upper ends as seen best in Figs. 5 and 7 so that the trolleys 10 clear the track 12 as they advance along the derailer 30 to the spaced vertical runners 36—38 of the chute 14. Notable also is the fact that the bar 34 is provided with a ramp 50 at its uppermost end resting upon the rail 20 for receiving wheels 16 of the trolleys 10 and elevating same off track 20 as trolleys 10 move from right to left in Fig. 1.

The derailer 30 is, as above noted, additionally attached to the track 12 by means 46 and 48 for ready release therefrom and the chute 14 is thereby suspended from the track 12 by a hook 52 joined with the rail 34 adjacent its ramp 50 and looped over the rail 20. The hook 52 is connected with the bar 32 by a strap 54. An elongated finger 56 rigid to the hook 52 engages one face of the rail 20 and is provided with an arcuate, uppermost surface for receiving one of the peripheral flanges of the wheels 16 to thereby cooperate with the ramp 50 in derailing the trolleys 10 or causing the same to be deflected from the track 12 to the derailer 30 when the trolleys 10 are moved from right to left viewing Fig. 1.

One or more braking means broadly designated by the numeral 58 is provided on the chute 14 to decelerate gravitational descent of the trolleys 10. Braking means 58 includes a pair of L-shaped shoes 60 in lapping relationship to the runner 36 and interconnected exteriorly of the latter by a cross bar 62. A bolt 64 rigid to the runner 36 and extending through the cross bar 62, is provided with a nut 66 for adjusting the tension of a spring 68 coiled about the bolt 64 and bearing against the cross bar 62. It is manifest that as the wheels 16 come into sliding contact with the inner faces of shoes 60—60, spring 68 will yield but downward movement of the trolleys 10 will be retarded because of the frictional engagement of the wheels 16 with the shoes 60—60.

It may be noted that the upper track 18, which like lower track 20 is supported from overhead structure 80 by brackets 82, bolt means 84 and spacers 86, need extend from derailer 30 back along track 20 only to the point where the meat or other article (not shown) is removed from hooks 28.

Any suitable receiver means (not shown) may be provided at the lowermost end of the chute 14 for collecting the trolleys 10 emanating from the interconnected runners 36 and 38, or a releasable retainer (not shown) could be provided to hold the trolleys 10 within the chute 14 until further use is to be made thereof.

As will be apparent, the derailer 30 and the guide chute assembly 14 associated therewith may be readily installed upon a given track 18—20 for use, then subsequently shifted to another similar track (not shown) simply by operation of the fastening means 48 and movement of the derailer and chute assembly 30—14 to such other track.

Heretofore, trolleys 10 have been manually removed from track 20 by means of long poles (not shown) with frequent accidents and resulting injuries to workmen from falling trolleys, as well as the necessity of gathering the trolleys before further use, after they have fallen to the floor. Such manner of removal has also resulted in increased wear and damage to trolleys through unimpeded falling, once they have been flipped from the track by means of the workman's pole. Obviously, the present invention overcomes all of these problems and disadvantages of the prior method of trolley removal.

Having thus described the invention, what is claimed as new and desired to be secured by Letters Patent is:

1. In a conveyor assembly of the type including an overhead track having a pair of relatively superimposed, vertically spaced, parallel rails and a plurality of trolleys each including a peripherally grooved wheel between the rails, there being a hook-carrying shank rotatably attached to one side of the wheel and depending therefrom, the groove of the wheel oppositely receiving said rails, a derailer adapted to derail the trolleys and direct the same to a desired point, said derailer comprising a normally vertical chute having a pair of parallel, spaced runners adapted to oppositely engage the groove in each wheel respectively; a pair of equally spaced, arcuate bars connecting the rails with the uppermost ends of corresponding runners, said bars being provided with identical lateral bends adjacent the track for deflecting the trolleys away from the track prior to descent of the trolleys into the chute, one of the bars being provided with an upwardly sloping, wheel-receiving ramp at one end thereof overlying the lowermost rail of the track, the normally lowermost, groove-engaging face of the other bar adjacent said rail being in alignment with the lowermost face of the uppermost rail of the track whereby the trolleys are derailed and directed into the chute; a plurality of hooks secured to the bars and adapted for placement over the lowermost rail to thereby support the derailer on the track in depending relationship therefrom; and braking means carried by said chute, said means including an elongated shoe pivotally mounted at one end thereof on one of the runners, the shoe being disposed to frictionally engage the peripheral edge of each of the trolleys respectively, and means for biasing said shoe into engagement with the wheel of a trolley passing through the chute whereby descent of each of the trolleys to said point is automatically decelerated.

2. In a conveyor assembly as set forth in claim 1 wherein said shoe consists of an L-shaped member having a pair of legs, one of said legs being disposed in overlapping relationship to the runner, the other leg being disposed in a position whereby the wheel of a trolley passing through the chute slidingly engages the innermost face of the same.

3. In a conveyor assembly as set forth in claim 2 wherein there is provided a bolt secured at one end thereof to the outermost face of said one runner, there being an opening in said one leg of the member for clearing the bolt, a stop adjustably secured to the bolt adjacent the opposite end of the latter, and a spring on said bolt in circumscribing relationship thereto, said spring bearing against the stop and the member for biasing the latter toward the runner.

References Cited in the file of this patent

UNITED STATES PATENTS

| | | |
|---|---|---|
| 451,602 | Richardson | May 5, 1891 |
| 500,992 | Carr | July 4, 1893 |
| 709,692 | Acklin | Sept. 23, 1902 |
| 812,346 | Laurence | Feb. 13, 1906 |
| 994,461 | Harding | June 6, 1911 |
| 1,341,354 | Booth | May 25, 1920 |
| 1,602,271 | Kilcarr | Oct. 5, 1926 |
| 1,848,963 | McKenny | Mar. 8, 1932 |
| 2,017,404 | Lorig | Oct. 15, 1935 |
| 2,407,620 | Vinsant | Sept. 10, 1946 |
| 2,499,812 | Beltman | Mar. 7, 1950 |
| 2,679,809 | Beltman et al. | June 1, 1954 |